United States Patent [19]
Peller

[11] Patent Number: 5,233,967
[45] Date of Patent: Aug. 10, 1993

[54] CRANKCASE BREATHER

[75] Inventor: Richard A. Peller, Milwaukee, Wis.

[73] Assignee: Harley-Davidson, Inc., Milwaukee, Wis.

[21] Appl. No.: 878,679

[22] Filed: May 5, 1992

[51] Int. Cl.⁵ ............................................. F02B 25/06
[52] U.S. Cl. ............................................. 123/572
[58] Field of Search ................................ 123/572

[56] References Cited
PUBLICATIONS
FIG. 3-42, Harley-Davidson Service Manual, No. 99484-92.

Primary Examiner—Noah P. Kamen
Attorney, Agent, or Firm—Michael, Best & Friedrich

[57] ABSTRACT

A breather system for a motorcycle engine having at least a pair of cylinders, an air cleaner, a cylinder head on each cylinder, a valve for connecting the cylinder head to the crankcase for venting the same, a first pipe having couplings at the opposite ends thereof for communicating the pipe to the interior of the cylinder heads, a second pipe connected at one end to one of the fittings and at its other end to the air cleaner.

4 Claims, 2 Drawing Sheets

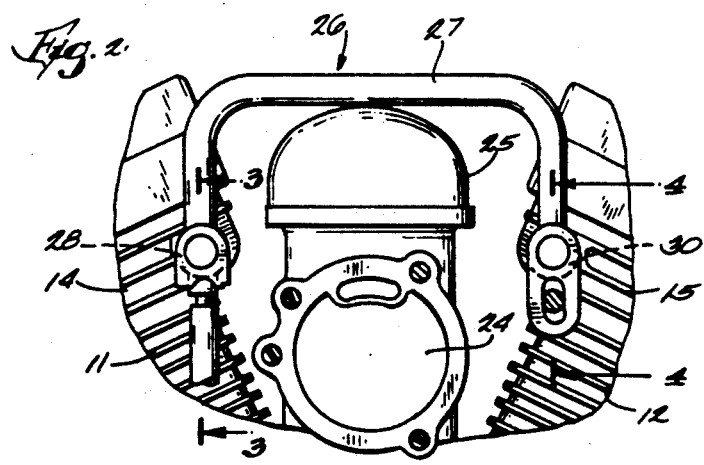
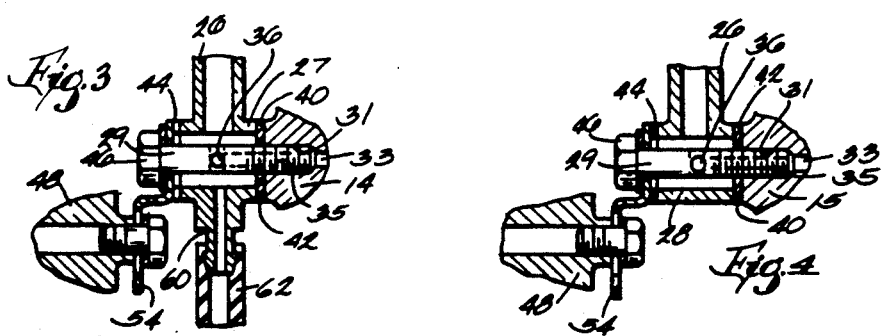
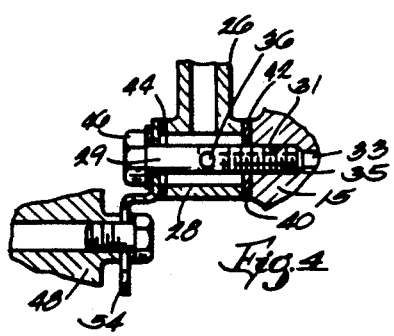
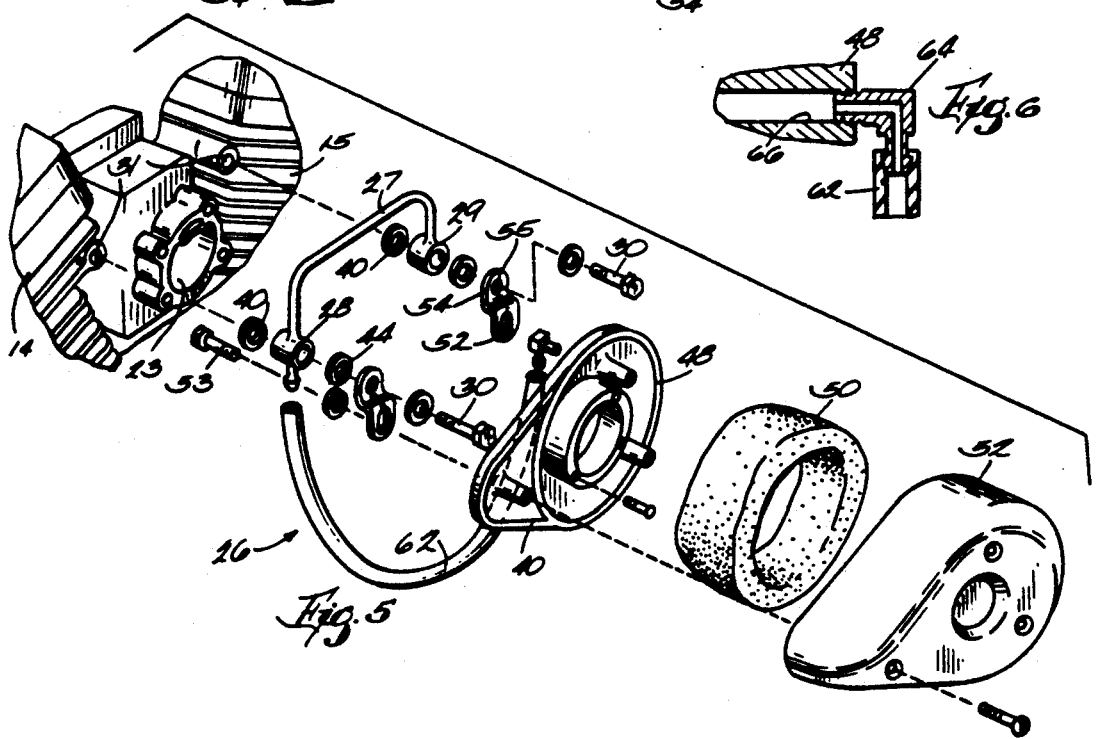

CRANKCASE BREATHER

BACKGROUND OF THE INVENTION

This invention relates to motorcycle engines and more particularly to a vent system for connecting the crankcase of a motorcycle engine to an air cleaner.

Pollution control laws and regulations require that vapors from the crankcase of internal combustion engines be cleaned prior to discharge into the atmosphere. There is, therefore, a need for a new and improved motorcycle engine crankcase breather system.

SUMMARY OF THE INVENTION

It is the primary object of the invention to provide a new and improved system for coupling an internal combustion engine crankcase breather system to the engine air cleaner.

This and other objects and advantages of the present invention will become more apparent from the detailed description thereof taken with the accompanying drawings.

In general terms, the invention comprises a breather system for a motorcycle internal combustion engine having at least a pair of cylinders, a crankcase, an air cleaner, a cylinder head for each cylinder, and a valve for connecting the cylinder head to the crankcase for venting the same. A first pipe means has first and second fitting means at the opposite ends thereof, each of said fitting means being coupled to one of said cylinder heads and communicating with the interior thereof and second pipe means connected at one end to one of said fitting means and at the other end to said air cleaner. According to a more specific aspect of the invention, each cylinder head includes a port, the first pipe means has a conduit portion and an end fitting at each end connected with the cylinder head ports for communicating the interior of the conduit portion to the interior of the cylinder heads and means for securing each end fitting to one of said cylinder heads. According to a more specific aspect of the invention, each fitting comprises a hollow member for surrounding the cylinder head port and a bolt extending through the hollow circular member for threading into said cylinder head, said bolt having a bore therein for communicating the interior of said cylinder head to the interior of the fitting.

BRIEF DESCRIPTION OF THE DRAWINGS

FIG. 2 is a fragmentary view of the engine illustrated in FIG. 1;

FIG. 3 is a view taken along lines 3—3 of FIG. 2;

FIG. 4 is a view taken along lines 4—4 of FIG. 3;

FIG. 5 is an expanded perspective view of a portion of the engine illustrated in FIG. 1; and FIG. 6 is a sectional view of a portion of the crankcase breather system according to the invention.

DETAILED DESCRIPTION OF THE PREFERRED EMBODIMENT

Figure 1:
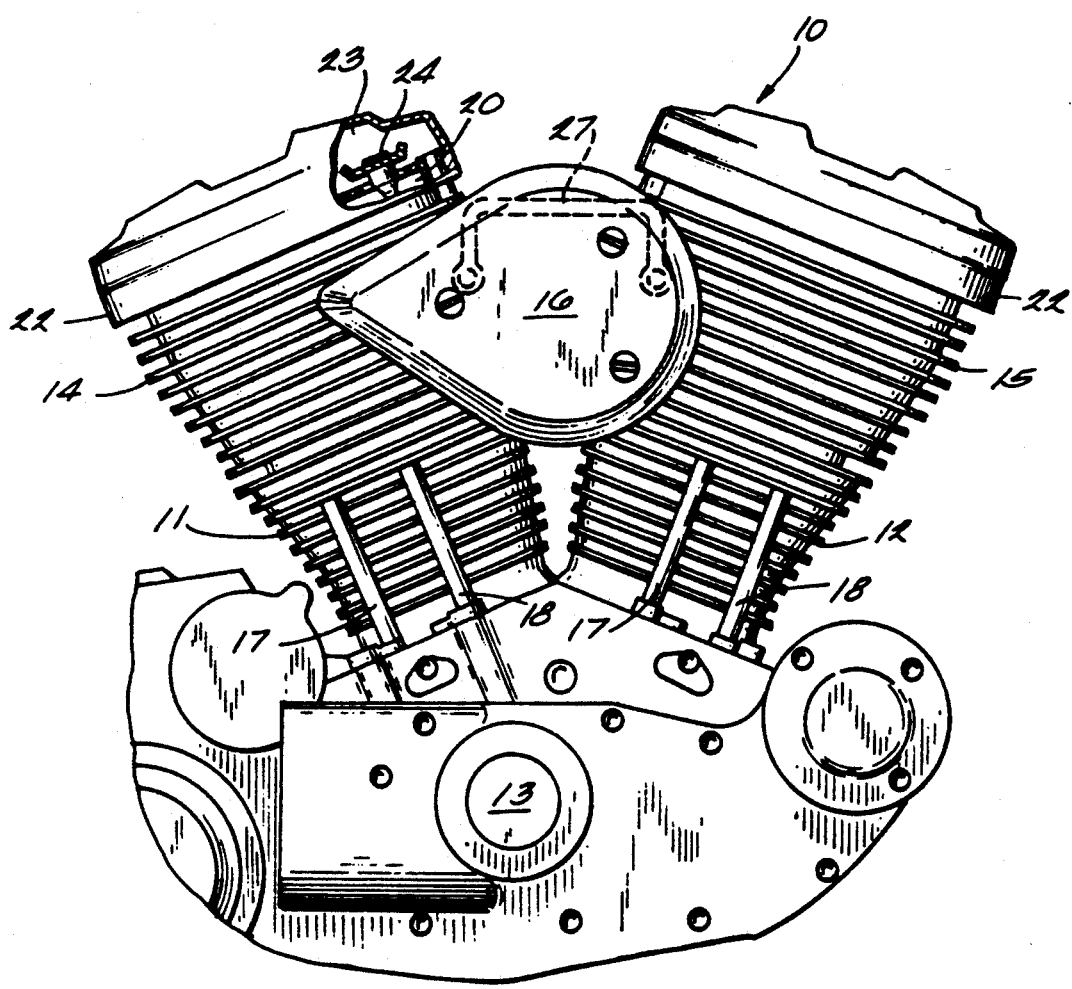
FIG. 1 is a front view showing a motorcycle engine incorporating the present invention.

FIG. 1 shows an internal combustion engine 10 for a vehicle, such as a motorcycle (not shown). The engine 10 has a pair of cylinder 11 and 12, a crankcase 13, cylinder heads 14 and 15 disposed, respectively, at the upper end of each cylinder 11 and 12 and an air cleaner 16. A pair of push rods 17 and 18 extend from the crankcase 13 into the cylinder heads 14 for operating intake and exhaust valves (not shown) connected to each cylinder. The push rods 17 and 18 are hollow and communicate the crankcase 12 with a chamber 20 in the middle rocker box section 22 of each cylinder head. An umbrella valve 24 in each rocker box opens on each downstroke of the piston (not shown) in each cylinder to vent crankcase air into a second chamber 23 of the rocker box. A passage (not shown) connects the chambers 23 to a third chamber (not shown) within each cylinder head 14 and 15. The air cleaner 16 is conventionally mounted on and communicates with the throat 24 of a carburetor 25.

Those portions of the engine 10 described above are all known to the art and the details thereof form no part of the invention. For example, these components of the engine may all be found in the Evolution engine manufactured by Harley-Davidson, Inc.

A breather system 26, according to the invention, couples the cylinder head 14 and 15 of each cylinder 11 and 12, respectively, to the air cleaner 16. In particular, the breather system 26 includes a first tubular member 27 having an open-ended cylindrical fitting 28 and 29 integrally mounted respectively at each end and communicating with the interior of the tube 27. Preferably, the tubular member 27 and the fittings 28 are formed of a suitable metallic material, although suitable non-metallic materials may also be employed. The fittings 28 and 29 are secured to the cylinder heads 14 and 15 by means of bolts 30 which thread into threaded holes 31 formed in each cylinder head 14 and 15. Each opening 31 has an axial passage 33 which communicates with the third chamber (not shown) on the interior of each cylinder head 14 and 15. The outer diameter of each bolt 30 is less than the inner diameter of fittings 28 and 29 and each has an axial bore 35 and cross holes 36 to connect passages 33 to the interior of fittings 28 and 29, respectively.

The opposite ends of fittings 28 and 29 are annular and are sealed by a first gasket 40 located between the end of the fittings and a land 42 formed on each cylinder head 14 and 15 in surrounding relation to the holes 31. The opposite ends of fittings 28 and 29 are sealed by gaskets 44 and the heads 46 of bolts 30.

The air cleaner 16 includes a backup plate 48, a filter element 50 and a cover 52. The air cleaner 16 may be mounted in any suitable manner, such as by screws, over the throat 23 of the carburetor 24 and may be further supported in a suitable fashion as required. In the illustrated embodiment, the air cleaner 16 is further supported by means of brackets 54, each having a hole 55 for receiving bolt 30 so that one end of each bracket 54 is clamped between the head 46 of bolt 30 and the land 42 on the respective cylinder heads. The opposite ends of each bracket 54 may be offset and may include a slot 57 for receiving a bolt 53 which is threadably received in the back-up plate 48 of air cleaner 16.

The fitting 28 also includes a nipple 60 which communicates with the interior thereof for receiving one end of a tube 62, which may be flexible. A second, generally L-shaped nipple 64 is threadably received in an opening 66 in back-up plate 48 for communicating with the interior of the air cleaner 16. The opposite end of nipple 64 couples to one end of the tube 62.

As those skilled in the art will appreciate, each time the cylinder within one of the cylinders 11 or 12 descends, the pressure within the crankcase 13 will increase, thereby opening the respective umbrella valves 24 in a manner well-known in the art. The crankcase air will thus be forced into the rocker box sections of each cylinder head for passage into the fittings 28 and 29. The air then flows through tubular members 27 and 62 into the interior of the air filter 16 for release into the atmosphere.

While only a single embodiment of the invention has been illustrated and described, it is not intended to be limited thereby, but only by the scope of the appended claims.

I claim:

1. A breather system for a motorcycle engine having at least a pair of cylinders, a cylinder head mounted on each cylinder, means for connecting the cylinder head to the crankcase for venting the same, and an air cleaner, said breather system including first pipe means, first and second fitting means mounted, respectively, on the opposite ends of said first pipe means, means for securing said first and second fittings in a sealed relation to the first and second cylinder heads and for communicating with the interior thereof, and second pipe means connecting at least one of said fitting means to said air cleaner.

2. The breather system set forth in claim 1 wherein each fitting comprises a hollow, tubular member for surrounding an opening in the cylinder head, said mounting means includes bolt means extending through said hollow tubular member for engaging one end thereof for selaing the same and for holding the other end thereof in sealing relation with said cylinder head, said bolt means including passage means for communicating the interior of the cylinder head with the interior of the fitting.

3. The breather system set forth in claim 2 wherein one of said fitting means includes nipple means for receiving one end of said second pipe means and second nipple means for coupling the opposite end of said pipe means to said air cleaner.

4. The breather system set forth in claim 3 wherein said first pipe means is a generally U-shaped metallic member, said fittings being integrally mounted on the opposite ends thereof.

* * * * *